US009613091B2

(12) United States Patent
Mungi et al.

(10) Patent No.: US 9,613,091 B2
(45) Date of Patent: *Apr. 4, 2017

(54) ANSWERING TIME-SENSITIVE QUESTIONS

(71) Applicant: International Business Machines Corporation, Armonk, NY (US)

(72) Inventors: Ashish Mungi, Bangalore (IN); Joy Mustafi, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/273,738

(22) Filed: Sep. 23, 2016

(65) Prior Publication Data

US 2017/0011036 A1    Jan. 12, 2017

Related U.S. Application Data

(63) Continuation of application No. 14/453,891, filed on Aug. 7, 2014.

(51) Int. Cl.
*G06F 17/28*    (2006.01)
*G06F 17/30*    (2006.01)
*G06F 17/27*    (2006.01)

(52) U.S. Cl.
CPC ...... *G06F 17/3043* (2013.01); *G06F 17/2705* (2013.01); *G06F 17/278* (2013.01); *G06F 17/2735* (2013.01); *G06F 17/2785* (2013.01)

(58) Field of Classification Search
CPC ............. G06F 17/3043; G06F 17/2735; G06F 17/2785; G06F 17/2705; G06F 17/278
(Continued)

(56) References Cited

U.S. PATENT DOCUMENTS 5,442,780 A  *   8/1995  Takanashi ........... G06F 17/3043
5,995,659 A  *   11/1999  Chakraborty ...... G06K 9/00456
                                                                 382/176
(Continued)

FOREIGN PATENT DOCUMENTS

JP    2007207061 A  *  8/2007
JP    2012141910 A  *  7/2012
(Continued)

OTHER PUBLICATIONS

Bergstein, "Intelligent Solutions, Your Brain, Analytical Thinking," Wolters Kluwer Solutions, Oct. 3, 2011, p. 1 http://solutions.wolterskluwer.com/blog/2011/10/intelligent-solutions-your-brain-analytical-thinking/, Accessed on Sep. 8, 2014.
(Continued)

*Primary Examiner* — Tammy Paige Goddard
*Assistant Examiner* — Edwin S Leland, III
(74) *Attorney, Agent, or Firm* — Patricia B. Feighan

(57) ABSTRACT

A method providing an answer to an input question containing at least one time-sensitive word or at least one time-sensitive phrase using natural language processing (NLP) is provided. The method may include receiving the input question. The method may also include performing natural language processing (NLP) analysis on the input question to extract a required value phrase. The method may further include forming at least one mathematical equation based on the extracted required value phrase. Additionally, the method may include forming at least one interim question based on the extracted required value phrase. The method may further include solving the at least one formed mathematical equation and the at least one formed interim question. The method may also include narrating the answer to the input question in natural language based on the solved
(Continued)

at least one interim question or the solved at least one mathematical equation.

20 Claims, 12 Drawing Sheets

(58) Field of Classification Search
USPC .................................................. 704/9
See application file for complete search history.

(56) References Cited

U.S. PATENT DOCUMENTS

| | | | |
|---|---|---|---|
| 7,792,829 B2 | 9/2010 | Brill et al. | |
| 8,275,803 B2 | 9/2012 | Brown et al. | |
| 8,311,973 B1* | 11/2012 | Zadeh ..................... | G06N 7/02 706/62 |
| 8,332,394 B2* | 12/2012 | Fan ....................... | G06F 17/30654 707/723 |
| 8,364,488 B2* | 1/2013 | Kurzweil ............... | G10L 13/043 704/258 |
| 8,538,744 B2 | 9/2013 | Roberts et al. | |
| 8,612,478 B1* | 12/2013 | Duong ................... | G06F 17/3087 434/322 |
| 8,655,866 B1* | 2/2014 | Provine ................. | G06F 17/30864 706/14 |
| 8,700,620 B1* | 4/2014 | Lieberman ............ | G06F 17/30731 707/728 |
| 9,330,084 B1* | 5/2016 | Kadambi ............... | G06F 17/2881 |
| 9,430,557 B2 | 8/2016 | Bhat et al. | |
| 9,430,558 B2* | 8/2016 | Bhat ...................... | G09B 7/00 |
| 9,460,075 B2 | 10/2016 | Mungi et al. | |
| 2003/0115192 A1* | 6/2003 | Kil ........................ | G06F 17/30539 |
| 2003/0221171 A1* | 11/2003 | Rust ...................... | G06F 17/21 715/236 |
| 2004/0253569 A1* | 12/2004 | Deane .................... | G09B 17/00 434/178 |
| 2005/0080614 A1* | 4/2005 | Bennett ................. | G06F 17/27 704/9 |
| 2005/0289141 A1* | 12/2005 | Baluja ................... | G06F 17/2735 |
| 2006/0036512 A1* | 2/2006 | Maccarthy ............ | G06Q 10/0637 705/7.36 |
| 2006/0053000 A1* | 3/2006 | Moldovan ............. | G06F 17/30401 704/9 |
| 2006/0173834 A1* | 8/2006 | Brill ...................... | G06F 17/30554 |
| 2006/0224722 A1* | 10/2006 | McGowan ............. | G06Q 10/107 709/224 |
| 2006/0230350 A1* | 10/2006 | Baluja ................... | G06F 3/0237 715/700 |
| 2008/0097748 A1* | 4/2008 | Haley .................... | G06F 17/2785 704/9 |
| 2009/0112787 A1* | 4/2009 | Ginzberg ............... | G06N 5/025 706/47 |
| 2009/0287678 A1* | 11/2009 | Brown .................. | G06F 17/30654 |
| 2010/0077032 A1* | 3/2010 | Drennan ................ | G06Q 50/01 709/206 |
| 2011/0153312 A1* | 6/2011 | Roberts ................. | G06F 17/30654 704/9 |
| 2011/0307435 A1* | 12/2011 | Overell ................. | G06F 17/278 706/46 |
| 2012/0209852 A1* | 8/2012 | Dasgupta .............. | G06F 17/30707 707/740 |
| 2012/0209879 A1* | 8/2012 | Banerjee ............... | G06F 17/30696 707/776 |
| 2013/0007033 A1 | 1/2013 | Brown et al. | |
| 2013/0013615 A1* | 1/2013 | Brown .................. | A61B 5/00 707/741 |
| 2013/0024487 A1* | 1/2013 | Yi ......................... | G06F 17/215 708/136 |
| 2013/0031082 A1* | 1/2013 | Wolfram ............... | G06F 17/30401 707/706 |
| 2013/0080422 A1* | 3/2013 | Pan ....................... | G06Q 30/00 707/722 |
| 2013/0091424 A1* | 4/2013 | Dallari .................. | G06F 17/30616 715/255 |
| 2013/0171605 A1* | 7/2013 | Tang ..................... | G09B 5/00 434/352 |
| 2013/0226562 A1* | 8/2013 | Arnon ................... | G06F 17/30831 704/9 |
| 2013/0226846 A1* | 8/2013 | Li et al. ................ | G06N 5/02 706/12 |
| 2013/0262501 A1* | 10/2013 | Kuchmann-Beauger .................... | G06F 17/30958 707/769 |
| 2013/0275122 A1* | 10/2013 | Park ...................... | G06F 17/28 704/9 |
| 2014/0040312 A1* | 2/2014 | Gorman ................ | G06F 17/2785 707/771 |
| 2014/0075410 A1* | 3/2014 | Wolfram ............... | G06F 8/30 717/106 |
| 2014/0229497 A1* | 8/2014 | Wolfram ............... | G06F 17/30569 707/758 |
| 2014/0250130 A1* | 9/2014 | Stockton ............... | G06F 17/30616 707/741 |
| 2014/0258817 A1* | 9/2014 | Carrier ................. | G06F 17/211 715/202 |
| 2014/0280256 A1* | 9/2014 | Wolfram ............... | G06F 17/30943 707/755 |
| 2014/0316768 A1* | 10/2014 | Khandekar ........... | G06F 17/30654 704/9 |
| 2015/0019946 A1* | 1/2015 | Zarras ................... | G06F 3/04842 715/219 |
| 2015/0169539 A1* | 6/2015 | Jamrog ................. | G06F 17/2705 704/9 |
| 2015/0324413 A1* | 11/2015 | Gubin ................... | G06F 17/30353 715/703 |
| 2015/0331846 A1* | 11/2015 | Guggilla ............... | G06F 17/2705 704/9 |
| 2015/0363390 A1 | 12/2015 | Mungi et al. | |
| 2015/0363391 A1* | 12/2015 | Mungi ................... | G06F 17/271 704/9 |
| 2016/0041980 A1* | 2/2016 | Mungi ................... | G06F 17/3043 704/9 |
| 2016/0180742 A1* | 6/2016 | Lee ....................... | G06F 17/274 704/9 |
| 2016/0293034 A1* | 10/2016 | Agarwalla ............. | G06N 99/005 |

FOREIGN PATENT DOCUMENTS

| | | | |
|---|---|---|---|
| WO | 2006042028 A2 | 4/2006 | |
| WO | WO 2006042028 A2 * | 4/2006 | ....... G06F 17/30654 |
| WO | 2009140473 A1 | 11/2009 | |

OTHER PUBLICATIONS

Bhat et al., "Automatic Data Interpretation and Answering Analytical Questions With Tables and Charts," Application and Drawings, Filed on Jun. 21, 2016, p. 1-36, U.S. Appl. No. 15/188,086.
Çakiroglu, "Can Computer Understand and Solve Turkish Arithmetic Problems?," World Applied Sciences Journal, 2008, p. 311-317, vol. 5, Issue 3, IDOSI Publications.
Carasco, "Free math problem solver," Basic-mathematics.com, p. 1-3, http://www.basic-mathematics.com/free-math-problem-solver.html, Accessed on May 8, 2014.
Chudov, "Algebra Homework Help—People's Math!," Algebra Homework Help, Algebra Solvers, Free Math Tutors, p. 1-3, http://www.algebra.com/, Accessed on May 8, 2014.
CMU, "Parse a sentence," Link Grammar, p. 1, Carnegie Mellon University, http://www.link.cs.cmu.edu/link/submit-sentence-4.html, Accessed on May 8, 2014.
Cornell, "What is Anaphora Resolution?," 2000, p. 1, http://www.cs.cornell.edu/boom/2000sp/2000%20projects/anaphora/definition.html, Accessed on May 8, 2014.
Deane et al, "Automatic Item Generation via Frame Semantics: Natural Language Generation of Math Word Problems," Educational Testing Service, 2003, p. 1-26.
Demir et al., "Interactive SIGHT into Information Graphics," W4A2010 Technical, Apr. 26-27, 2010, ACM, Raleigh.

(56) References Cited

OTHER PUBLICATIONS

Dumais et al, "Web Question Answering: Is More Always Better?," SIGIR'02, Aug. 11-15, 2002, ACM, Tampere, Finland.

Filloy et al, "Arithmetic/Algebraic Problem-Solving and the Representation of Two Unknown Quantities," Proceedings of the 28th Conference of the International Group for the Psychology of Mathematics Education, 2004, p. 391-398, vol. 2, PME28, Cinvestav, Mexico.

Finkel et al, "Stanford Named Entity Recognizer (NER)," The Stanford Natural Language Processing Group, Last Updated Jan. 4, 2014, p. 1-4, Version 3.3.1, http://nlp.stanford.edu/software/CRF-NER.shtml, Accessed on Jun. 3, 2014.

Gelb, "Experiments with a Natural Language Problem-Solving System," Computer Understanding I (Communication), p. 455-462, Session No. 10, IBM Corporation, Systems Development Division, Poughkeepsie, New York.

Google, "Calculator and unit converter," Search Help, p. 1-2, https://supportgoogle.com/websearch/answer/3284611?hl=en, Accessed on May 8, 2014.

Gray, "Research on the Problem of Translating Natural Language Sentences into Algebra," The Mathematics Editor, p. 41-43, vol. 6, No. 2.

Hinsley et al, "From Words to Equations Meaning and Representation in Algebra Word Problems," Cognitive Processes in Comprehension, 1977, p. 89-106, Chapter 4. Algebra Word Problems, Lawrence Erlbaum Associates, Hillsdale, NJ.

IBM, "IBM Exploratory Computer Vision," IBM Research, Last Updated Sep. 7, 2013, p. 1, http://researcher.watson.ibm.com/researcher/view_group.php?id=1903, Accessed on Sep. 8, 2014.

IBM, "IBM i2 Text Chart," IBM Software White Paper, Nov. 2012, p. 1-11, IBM Corporation.

India Bix, "Bar Charts—Data Interpretation Questions and Answers," 2014 IndiaBix Technologies, p. 1-2, http://www.indiabix.com/data-interpretation/bar-charts/, Accessed on Sep. 8, 2014.

India Bix, "Line Charts—Data Interpretation Questions and Answers," 2014 IndiaBix Technologies, p. 1-2, http://www.indiabix.com/data-interpretation/line-charts/, Accessed on Sep. 8, 2014.

India Bix, "Pie Charts—Data Interpretation Questions and Answers," 2014 IndiaBix Technologies, p. 1-2, http://www.indiabix.com/data-interpretation/pie-charts/, Accessed on Sep. 8, 2014.

India Bix, "Table Charts—Data Interpretation Questions and Answers," 2014 IndiaBix Technologies, p. 1, http://www.indiabix.com/data-interpretation/table-charts/, Accessed on Sep. 8, 2014.

Kerr, "SAT Tip of the Week: 4 Tips to Solve Pie Chart Questions," Veritas Prep, Posted on Sep. 18, 2013, p. 1-2, Veritas, LLC, http://www.veritasprep.com/blog/2013/09/sat-tip-of-the-week-4-tips-to-solve-pie-chart-questions/, Accessed on Sep. 8, 2014.

Kraf et al, "Syntactic ambiguity," Linguistics Online, p. 1, http://languagelink.let.uu.nl/~lion/?s=Grammar_exercises/grammar_4, Accessed on May 8, 2014.

Liguda et al, "Modeling Math Word Problems with Augmented Semantic Networks," NLDB, 2012, p. 247-252, LNCS 7337, Springer-Verlag Berlin Heidelberg.

Liu et al, "Using Stranger as Sensors: Temporal and Geo-sensitive Question Answering via Social Media," International World Wide Web Conference Committee, May 13-17, 2013, WWW 2013, ACM, Rio de Janiero, Brazil.

MacCartney et al, "Stanford Dependencies," The Stanford Natural Language Processing Group, p. 1-3, http://nlp.stanford.edu/software/stanford-dependencies.shtml, Accessed on May 8, 2014.

Marcus et al, "The Penn Treebank Project," Computer and Information Science Department at the University of Pennsylvania, Last Change: Feb. 2, 1999, p. 1-2, http://www.cis.upenn.edu/~treebank/, Accessed on May 8, 2014.

Moldovan et al, "Temporally Relevant Answer Selection," Language Computer Corporation, Richardson, Texas.

Morton et al, "A Novel Framework for Math Word Problem Solving," International Journal of Information and Education Technology, Feb. 2013, p. 88-93, vol. 3, No. 1.

Online Math Learning, "How to solve Algebra Word Problems?," p. 1-5, http://www.onlinemathlearning.com/algebra-word-problems.html, Accessed on May 8, 2014.

Petrov, "Online Math Problem Solver," Math10, p. 1-2, http://www.math10.com/en/problem-solver/, Accessed on May 8, 2014.

Pinto et al., "Table Extraction Using Conditional Random Fields," SIGIR'03, Jul. 28-Aug. 1, 2003, p. 235-242, ACM, Toronto, Canada.

Raphael, "Research on Intelligent Question-Answering Systems," The Clearinghouse for Federal Scientific and Technical Information, Period Covered: Apr. 15, 1966 through May 14, 1968, SRI Project 6001, Stanford Research Institute, Menlo Park, California.

Sanampudi et al, "A Question Answering System Supporting Temporal Queries," ICAC3, 2013, p. 207-214, CCIS 361, Springer-Verlag, Berlin Heidelberg.

Sanampudi et al, "Temporal Reasoning in Natural Language Processing: A Survey," International Journal of Computer Applications, 2010, p. 68-72, vol. 1, No. 4.

Saquete et al, "Splitting Complex Temporal Questions for Question Answering systems," Departamento de Lenguajes y Sistemas Informáticos, Universidad de Alicante, Alicante, Spain.

Sarmiento et al, "Co-constructed Narratives in Online, Collaborative Mathematics Problem-Solving," Virtual Math Teams Project, p. 1-8, The Math Forum @ Drexel University, Philadelphia, PA.

Singh et al, "Automatically Generating Algebra Problems," Association for the Advancement of Artificial Intelligence, 2012, Microsoft Research.

Stanford, "Stanford Parser," Stanford NLP, Last updated Jul. 10, 2012, p. 1, http://nlp.stanford.edu:8080/parser/, Accessed on May 8, 2014.

Tengli et al., "Learning Table Extraction from Examples," School of Computer Science, Carnegie Mellon University, Pittsburgh, PA.

Tseng et al, "On mapping natural language constructs into relational algebra through E-R representation," Republic of China National Science Council, p. 1-31, Hsinchu, Taiwan, ROC.

Wayne State University, "Analytical & Problem Solving Skills," Wayne LEADS, p. 1-2, http://hr.wayne.edu/leads/resource-guide/analytical-skills.php, Accessed on Sep. 8, 2014.

Webmath, "Welcome to Webmath!," WebMath—Solve Your Math Problem, p. 1-2, Discovery Education, http://www.webmath.com/index.html, Accessed on May 8, 2014.

Wei et al., "Answer Retrieval From Extracted Tables," Center for Intelligent Information Retrieval, University of Massachusetts Amherst, Amherst, MA.

Wei et al., "Table Extraction for Answer Retrieval," Center for Intelligent Information Retrieval, p. 1-26, University of Massachusetts Amherst, Amherst, MA.

Wikipedia, "Morphological analysis," Last Modified on Nov. 2, 2013, p. 1, Wikipedia: the Free Encyclopedia, http://en.wikipedia.org/wiki/Morphological_analysis, Accessed on May 8, 2014.

Wikipedia, "Named-entity recognition," Last Modified on May 13, 2014, p. 1-5, Wikipedia: the Free Encyclopedia, http://en.wikipedia.org/wiki/Named-entity_recognition, Accessed on Jun. 3, 2014.

Wikipedia, "Phrase chunking," Last Modified on Sep. 26, 2013, p. 1, Wikipedia: the Free Encyclopedia, http://en.wikipedia.org/wiki/Phrase_chunking, Accessed on Jun. 3, 2014.

IBM, "List of IBM Patents or Patent Applications Treated as Related (Appendix P)," Oct. 4, 2016, p. 1-2.

Bhat et al., "Automatic Data Interpretation and Answering Analytical Questions With Tables and Charts," Application and Drawings, Filed on Jun. 21, 2016, p. 1-35, U.S. Appl. No. 15/188,086.

Bhat et al., "Automatic Data Interpretation and Answering Analytical Questions With Tables and Charts," Application and Drawings, Filed on Jun. 21, 2016, p. 1-34, U.S. Appl. No. 15/188,068.

* cited by examiner

| No. | Step in Flowchart #1 | Example Question #1 | Example Question #2 | Example Question #3 | Example Question #4 |
|---|---|---|---|---|---|
| 1 | Input Question | Which country won the ICC Cricket World Cup in 2011? | How old is the President of India? | How old is the Eiffel Tower? | What is the current temperature in Bangalore, India? |
| 8 | Form mathematical equation(s) to be solved to answer the Required Value Phrase | <NIL> | age = current date - date of birth | age = current date - date of building completion | current temperature @now |
| 9 | For each relevant variable Rx, form interim questions for determining value of each relevant variable | <NIL> | What is the current date? Who is the President of India? What is the date of birth of the President of India? | What is the current date? What is the date of building completion of Eiffel Tower? | What is the current temperature in Bangalore, India? |
| 10 | Determine the current value of each relevant variable Rx by Asking the interim questions to a question-answer system OR Search the internet OR Search a data repository or database OR Search a Corpus, etc | <NIL> | Current Date = 09-Aug-2013<br>President of India = Pranab Mukherjee<br>What is the date of birth of the President of India? | current date = 09-Aug-2013<br>date of building completion = 31-March-1889 | 25 degree C at 8.45pm on 09-Aug-2013 (source: http://www.acuweather.com) |
| 11 | Any interim question unanswered? | <NIL> | YES | NO | NO |
| 12 | Rephrase unanswered interim questions by substituting values of known relevant variable(s) into the equation(s) | <NIL> | What is date of birth of Pranab Mukherjee (President of India)? | <NOT APPLICABLE> | <NOT APPLICABLE> |

FIG. 4B

| No. | Step in Flowchart #1 | Example Question #1 | Example Question #2 | Example Question #3 | Example Question #4 |
|---|---|---|---|---|---|
| 1 | Input Question | Which country won the ICC Cricket World Cup in 2011? | How old is the President of India? | How old is the Eiffel Tower? | What is the current temperature in Bangalore, India? |
| 13 | Determine the current value of each remaining relevant variable Rx by asking the rephrased interim questions to a question-answer system OR Search the internet OR Search a data repository or database OR Search a Corpus, etc | <NIL> | Date of birth of Pranab Mukherjee (President of India) = 11-Dec-1935 | <NOT APPLICABLE> | <NOT APPLICABLE> |
| 14 | Any interim question unanswered? | <NIL> | NO | NO | NO |
| 15 | Using current values of relevant variable(s) Rx, solve the set of equations to get the answer for the "Required Value Phrase" | <NIL> | age = 09-Aug-2013 - 11-Dec-1935 = 77 years 7 months 29 days | age = 09-Aug-2013 - 31-Mar-1889 = 124 years 4 months 9 days | 25 degree C at 8.45pm on 09-Aug-2013 (source: http://www.acuweather.com) |
| 16 | Narrate the answer in natural language, in terms of the "Required Value Phrase" as an answer to the original input question | <NIL> | President of India (Pranab Mukherjee) is 77 years 7 months 29 days old | Eiffel Tower is 124 years 4 months 9 days old | Current temperature in Bangalore, India is 25 degree C at 8.45pm on 09-Aug-2013 (source: http://www.acuweather.com) |

FIG. 4C

| No. | Step in Flowchart #1 | Example Question #5 | Example Question #6 | Example Question #7 | Example Question #8 |
|---|---|---|---|---|---|
| 1 | Get the Input Question containing time-sensitive words or phrases in natural language (from a data source or user interface) | How long has the CEO of IBM held office? | How long has the Chairman of IBM held office? | What is the petrol price in Bangalore? | What is the change in petrol price in Bangalore in the past month? |
| 2 | Identify all the time-sensitive words or phrases (T-Words) in the input question | long, CEO | long, Chairman | price | price, past month |
| 3 | T-Words > 0 ? | YES | YES | YES | YES |
| 4 | For the input question, perform NLP Analysis (POS Tagging, Parsing / Parse Tree Generation, Typed Dependencies, Chunking, Named Entity Resolution, etc) | <Output from NLP Analysis not listed in this example – it can be done using NLP tools> | <Output from NLP Analysis not listed in this example – it can be done using NLP tools> | <Output from NLP Analysis not listed in this example – it can be done using NLP tools> | <Output from NLP Analysis not listed in this example – it can be done using NLP tools> |
| 5 | Extract the Required Value Phrase (such as "how old") in the input question | how long | how long | petrol price in Bangalore | change in petrol price in Bangalore |
| 6 | For each T-Word, get the list of all associated lookup phrases from the proposed T-Word Dictionary | long, CEO | long, Chairman | price | price, past month |
| 7 | Analyze the input question and determine the list of relevant lookup phrases / relevant variables | date of assuming office, current date, CEO of IBM | date of assuming office, current date, Chairman of IBM | price per litre | price, current date, previous date |

FIG. 4D

| No. | Step in Flowchart #1 | Example Question #5 | Example Question #6 | Example Question #7 | Example Question #8 |
|---|---|---|---|---|---|
| 1 | Input Question | How long has the CEO of IBM held office? | How long has the Chairman of IBM held office? | What is the petrol price in Bangalore? | What is the change in petrol price in Bangalore in the past month? |
| 8 | Form mathematical equations(s) to be solved to answer the Required Value Phrase | how long = current date - date of assuming office | how long = current date - date of assuming office | current price per litre @now | previous date = current date - 1 month<br>change in petrol price = petrol price (current date) - petrol price (previous date) |
| 9 | For each relevant variable Rx, form interim questions for determining value of each relevant variable | What is the current date?<br>Who is the CEO of IBM?<br>What is the date of assuming office of the CEO of IBM? | What is the current date?<br>Who is the Chairman of IBM?<br>What is the date of assuming office of the Chairman of IBM? | What is the current price per litre for petrol in Bangalore? | What is the current date?<br>What was the previous date?<br>What is the current price per litre for petrol in Bangalore India?<br>What was the price per litre for petrol in Bangalore India on previous date? |
| 10 | Determine the current value of each relevant variable Rx by Asking the interim questions to a question-answer system OR Search the Internet OR Search a data repository or database OR Search a Corpus, etc | Current Date = 09-Aug-2013<br>CEO of IBM = Virginia Rometty<br>What is the date of assuming office of the CEO of IBM? | Current Date = 09-Aug-2013<br>Chairman of IBM = Virginia Rometty<br>What is the date of assuming office of the Chairman of IBM? | 78.12 INR / Litre on 09-Aug-2013 (source: http://www.mypetrolprice.com) | Current date = 09-Aug-2013<br>Previous date = current date - 1 month = 09-July-2013<br>Current petrol price per litre in Bangalore = 78.12 INR / Litre on 09-Aug-2013 (source: http://www.mypetrolprice.com)<br>What was the price per litre for petrol in Bangalore India on previous date? |
| 11 | Any interim question unanswered? | YES | YES | NO | YES |

FIG. 4E

| No. | Step in Flowchart #1 | Example Question #5 | Example Question #6 | Example Question #7 | Example Question #8 |
|---|---|---|---|---|---|
| 1 | Input Question | How long has the CEO of IBM held office? | How long has the Chairman of IBM held office? | What is the petrol price in Bangalore? | What is the change in petrol price in Bangalore in the past month? |
| 12 | Rephrase unanswered interim questions by substituting values of known relevant variable(s) into the equation(s) | What is date of assuming office of Virginia Rometty (CEO of IBM)? | What is date of assuming office of Virginia Rometty (Chairman of IBM)? | <NOT APPLICABLE> | What was the price per litre for petrol in Bangalore India on 09-July-2013? |
| 13 | Determine the current value of each remaining relevant variable Rx by Asking the rephrased interim questions to a question-answer system OR Search the Internet OR Search a data repository or database OR Search a Corpus, etc | Date of assuming office of Virginia Rometty (CEO of IBM) = 01-Jan-2012 | Date of assuming office of Virginia Rometty (Chairman of IBM) = 01-Oct-2012 | <NOT APPLICABLE> | 75.41 INR / Litre on 09-July-2013 (source: http://www.mypetrolprice.com) |
| 14 | Any interim question unanswered? | NO | NO | NO | NO |
| 15 | Using current values of relevant variable(s), solve the set of equations to get the answer for the "Required Value Phrase" | duration in office = 09-Aug-2013 - 01-Jan-2012 = 1 year 07 months 09 days | duration in office = 09-Aug-2013 - 01-Oct-2012 = 10 months 9 days | 78.12 INR / Litre on 09-Aug-2013 (source: http://www.mypetrolprice.com) | change in petrol price = petrol price (current date) - petrol price (previous date) = 78.12 - 75.41 = +2.71 INR/Litre |
| 16 | Narrate the answer in natural language, in terms of the "Required Value Phrase" as an answer to the original input question | CEO of IBM (Virginia Rometty) has held office for 1 year 07 months 09 days till date | Chairman of IBM (Virginia Rometty) has held office for 10 months 9 days till date | Petrol price in Bangalore is INR 78.12 per Litre on 09-Aug-2013 (source: http://www.mypetrolprice.com) | Change in petrol price in Bangalore in the past month is +2.71 INR/Litre. |

FIG. 4F

ANSWERING TIME-SENSITIVE QUESTIONS

CROSS REFERENCE TO RELATED APPLICATION

This application is related to the following commonly-owned, co-pending United States Patent Application filed on Jun. 17, 2014, the contents and disclosure of which is expressly incorporated by reference herein in its entirety: U.S. patent application Ser. No. 14/306,267 for "SOLVING AND ANSWERING ARITHMETIC AND ALGEBRAIC PROBLEMS USING NATURAL LANGUAGE PROCESSING".

FIELD OF THE INVENTION

The present invention relates generally to the field of computing, and more particularly to answering time-sensitive questions.

BACKGROUND

Time-sensitive words or phrases are those whose values vary with time or depend on time. There are several types of questions which contain time-sensitive words or phrases which need to be resolved to their current values before the question can be answered. The answer is valid only at the specific point in time the question is asked, and it may change over time for the same question, i.e. if the same question is asked at different points in time, the answer may vary. For example, a question, such as, "How old is the President of Country X?" is a time-sensitive phrase, since it denotes a position and by reference it denotes the person who occupies the position at a point in time. As such, the answer to the question may vary depending on the year it was asked. If this question had been asked in the year 2010, the value for the phrase "President of Country X" would be different than if the question had been asked in the year 2013. Therefore, the same question asked at different times would yield different answers.

SUMMARY

According to one embodiment, a method for providing an answer to an input question containing at least one time-sensitive word or at least one time-sensitive phrase using natural language processing (NLP) is provided. The method may include receiving the input question. The method may also include performing natural language processing (NLP) analysis on the input question to extract a required value phrase. The method may further include forming at least one mathematical equation solved based on the extracted required value phrase. Additionally, the method may include forming at least one interim question based on the extracted required value phrase. The method may further include solving the at least one formed mathematical equation and the at least one formed interim question. The method may also include narrating the answer to the input question in natural language based on the solved at least one interim question or the solved at least one mathematical equation.

According to another embodiment, a computer system for providing an answer to an input question containing at least one time-sensitive word or at least one time-sensitive phrase using natural language processing (NLP) is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include receiving the input question. The method may also include performing natural language processing (NLP) analysis on the input question to extract a required value phrase. The method may further include forming at least one mathematical equation based on the extracted required value phrase. Additionally, the method may include forming at least one interim question based on the extracted required value phrase. The method may further include solving the at least one formed mathematical equation and the at least one formed interim question. The method may also include narrating the answer to the input question in natural language based on the solved at least one interim question or the solved at least one mathematical equation.

According to yet another embodiment, a computer program product providing an answer to a question containing at least one time-sensitive word or at least one time-sensitive phrase using natural language processing (NLP) is provided. The computer program product may include one or more computer-readable storage devices and program instructions stored on at least one of the one or more tangible storage devices, the program instructions executable by a processor. The computer program product may also include program instructions to receive the input question. The computer program product may also include program instructions to perform natural language processing (NLP) analysis on the input question to extract a required value phrase. The computer program product may further include program instructions to form at least one mathematical equation solved based on the extracted required value phrase.

Additionally, the computer program product may include program instructions to form at least one interim question based on the extracted required value phrase. The computer program product may further include program instructions to solve the at least one formed mathematical equation and the at least one formed interim question. The computer program product may also include program instructions to narrate the answer to the input question in natural language based on the solved at least one interim question or the solved at least one mathematical equation.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIGS. 4A-4F illustrate examples solving time-sensitive questions using the described algorithm in FIGS. 3A-3C according to one embodiment;

DETAILED DESCRIPTION

Figure 1:
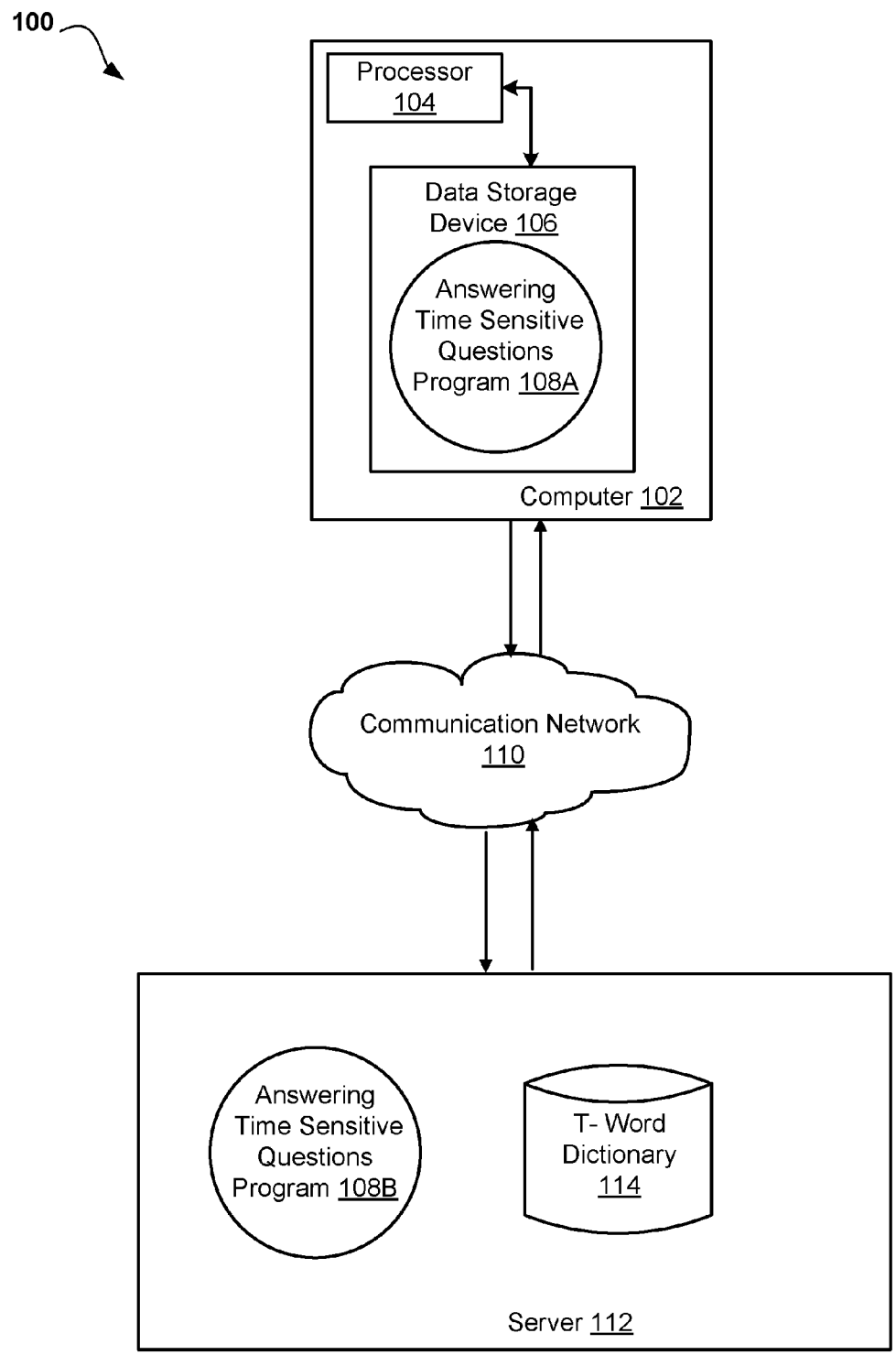
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly to answering time-sensitive questions. The following described exemplary embodiments provide a system, method and program product for answering time-sensitive questions in real-time using natural language processing (NLP).

As previously explained, time-sensitive words or phrases are those whose values vary with time or depend on time. There are several types of questions which contain time-sensitive words or phrases which need to be resolved to their current values before the question can be answered. The answer is valid only at the specific point in time the question is asked, and it may change over time for the same question, i.e. if the same question is asked at different points in time, the answer may vary. Therefore, it may be advantageous, among other things, to automatically answer such time-sensitive questions in real-time using natural language processing. As such, the present embodiment may allow a user to enter a question containing time-sensitive words or phrases in natural language and receive an automatic interactive response or correct answer from a computer in real-time.

According to at least one embodiment, a computer-based question-answer system may understand a question containing time-sensitive words or phrases stated in natural language and provide a natural language answer in real-time. One implementation of the present embodiment may utilize the concept of "T-Words" as time-sensitive words or phrases whose values depend on and/or vary with time.

Additionally, according to at least one implementation, the present embodiment may also include a "T-Word dictionary" which may contain a list of T-Words and their mapping to related lookup phrases or concept terms. These related concept terms or lookup phrases may be generic or domain specific. Additionally, the current value of these related concept terms or lookup phrases may have to be determined in order to calculate the current value of the T-Word. As such, a given T-Word may be mapped to multiple lookup phrases, only some of which (i.e., relevant lookup phrases") may be required to answer a given question. The T-Word dictionary may be created, updated, and/or maintained as a separate entity.

The present embodiment may use a Question Answer System to answer time-sensitive questions as well as utilize the concept of "T-Words". Additionally, the present embodiment may define and use a "T-Word Dictionary" containing a global list of generic or domain-specific time-sensitive words or phrases. Various implementations of the present embodiment may analyze an input question for T-Words and determine the list of relevant phrases or relevant variables from the T-Word Dictionary. Furthermore, the present embodiment may iteratively formulate interim questions and equations to look-up, search, determine, or calculate the current values of all the relevant variables as well as obtain the answer to the input question by solving the interim questions or equations in terms of the "Required Value Phrase".

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for answering time-sensitive questions in real-time using natural language processing (NLP). The present embodiment may be generic and may be used by a computer-based question-answer system to answer in real-time, a question containing time-sensitive words or phrases stated in natural language. As such, the present embodiment may be used for any natural language supported by natural language processing algorithms.

Additionally, implementations of the present embodiment may utilize existing technology, including, but not limited to the following:

Parsing/Syntactic Analysis: Parsing or Syntactic Analysis is the process of analyzing a string of symbols, either in natural language or in computer languages, according to the rules of a formal grammar. For example, Stanford Parser—http://nlp.stanford.edu:8080/parser/ or Carnegie Mellon University Parser: http://www.link.cs.cmu.edu/link/submit-sentence-4.html.

POS Tagging: In corpus linguistics, Part-Of-Speech Tagging (POS tagging or POST), also called grammatical tagging, is the process of marking up a word in a text (corpus) as corresponding to a particular part of speech, based on both its definition, as well as its context—i.e. relationship with adjacent and related words in a phrase, sentence, or paragraph. For example, University of Pennsylvania—Penn Tree Bank: http://www.cis.upenn.edu/~treebank/.

Typed Dependency Analysis: A representation of grammatical relations between words in a sentence. They have been designed to be easily understood and effectively used by people who want to extract textual relations. In general, dependencies are triplets: name of the relation, governor and dependent. For example, The Stanford Natural Language Processing Group—Typed Dependencies: http://nlp.stanford.edu/software/stanforddependencies.shtml.

Phrase Chunking: Phrase chunking is a natural language process that separates and segments a sentence into its subconstituents, such as noun, verb, and prepositional phrases. For example, Wikipedia: http://en.wikipedia.org/wiki/Phrase_chunking.

Named Entity Recognition (NER): Named-entity recognition (NER) (also known as entity identification and entity extraction) is a subtask of information extraction that seeks to locate and classify atomic elements in text into predefined categories such as the names of persons, organizations, locations, expressions of times, quantities, monetary values, percentages, etc. For example, Wikipedia: http://en.wikipedia.org/wiki/Named-entity recognition or Stanford Named Entity Recognizer: http://nlp.stanford.edu/software/CRF-NER.shtml.

Furthermore, the present embodiment may include an algorithm to answer time-sensitive questions using a Question Answer System (such as IBM Watson). The algorithm may include getting an Input Question containing time-sensitive words or phrases in natural language (from a data source or user interface). The algorithm may also include identifying all the time-sensitive words or phrases (T-Words) in the input question using a T-Word Dictionary. If the input question is not time-sensitive, and does not contain any T-Words (T-Words=0), then the algorithm may end. However, if the input question is time-sensitive, then it may contain T-Words (T-Words>0), and the algorithm may continue. As such, for the input question, NLP (natural language processing) analysis steps may be performed, such as POS Tagging, Parsing/Parse Tree Generation, Typed Dependencies, Chunking and Named Entity Recognition. Then, the output of the NLP analysis may be stored in a temporary repository or may be held in-memory.

According to at least one implementation, the "Required Value Phrase" is defined as the phrase or term in the input question that needs to be answered in order to answer the time-sensitive question. Then the Required Value Phrase (such as "how old") in the input question may be extracted and iteratively, for each T-Word in the input question, the algorithm may get all associated lookup phrases from the T-Word Dictionary. The algorithm may then analyze the input question and determine the list of relevant lookup phrases or relevant variables. Then, the algorithm may form mathematical equation(s) to be solved to answer the Required Value Phrase. As cross-referenced, the present embodiment may utilize the algorithms described with respect to the application entitled, "SOLVING AND ANSWERING ARITHMETIC AND ALGEBRAIC PROBLEMS USING NATURAL LANGUAGE PROCESSING" incorporated by reference herein to form and solve mathematical equations.

For each relevant variable, the present embodiment may formulate interim questions for determining value of the relevant variable and determine the current value of each relevant variable by asking the interim questions to a question-answer system; searching the Internet or searching a data repository or database; or searching a Corpus, etc. Then, the present embodiment may iterate if there are any interim question still unanswered, by rephrasing unanswered interim questions after substituting values of known relevant variable(s) into the equation(s), and determining the current value of each remaining relevant variable by asking the rephrased interim questions to a question-answer system; searching the Internet; searching a data repository or database; or searching a Corpus, etc. Using current values of all relevant variable(s), the present embodiment may solve the set of equations to answer the "Required Value Phrase" and narrate the answer in natural language, in terms of the "Required Value Phrase" as an answer to the original input question.

Referring now to FIG. 1, an exemplary networked computer environment 100 in accordance with one embodiment is depicted. The networked computer environment 100 may include a computer 102 with a processor 104 and a data storage device 106 that is enabled to run an Answering Time-sensitive Questions Program 108A. The networked computer environment 100 may also include a server 112 that is enabled to run an Answering Time-sensitive Questions Program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. The network computer environment may also include a T-Word Dictionary 114 which may contain a set of T-Words and their possible corresponding values. According to the present embodiment, "T-Words" may be defined as time-sensitive words or phrases whose values depend on and may vary with time. According to at least one implementation, the dictionary 114 may be created, updated, and maintained as a separate entity. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 5, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as an Answering Time-sensitive Questions Program 108A and 108B may run on the client computer 102 or on the server computer 112. The Answering Time-sensitive Questions Program 108A, 108B may be utilized to solve arithmetic and algebraic problems. For example, a user using an Answering Time-sensitive Questions Program 108A, running on a client computer 102, may connect via a communication network 110 to server computer 112, which may also be running an Answering Time-sensitive Questions Program 108B. Furthermore, the user using client computer 102 or server 112 may utilize the Answering Time-sensitive Questions Program 108A, 108B to answer time-sensitive questions (i.e., time-sensitive words or phrases) stated in natural language and to provide a natural language answer in real-time. The Answering Time-sensitive Question method is explained in further detail below with respect to FIGS. 3A-3C.

Figure 2:
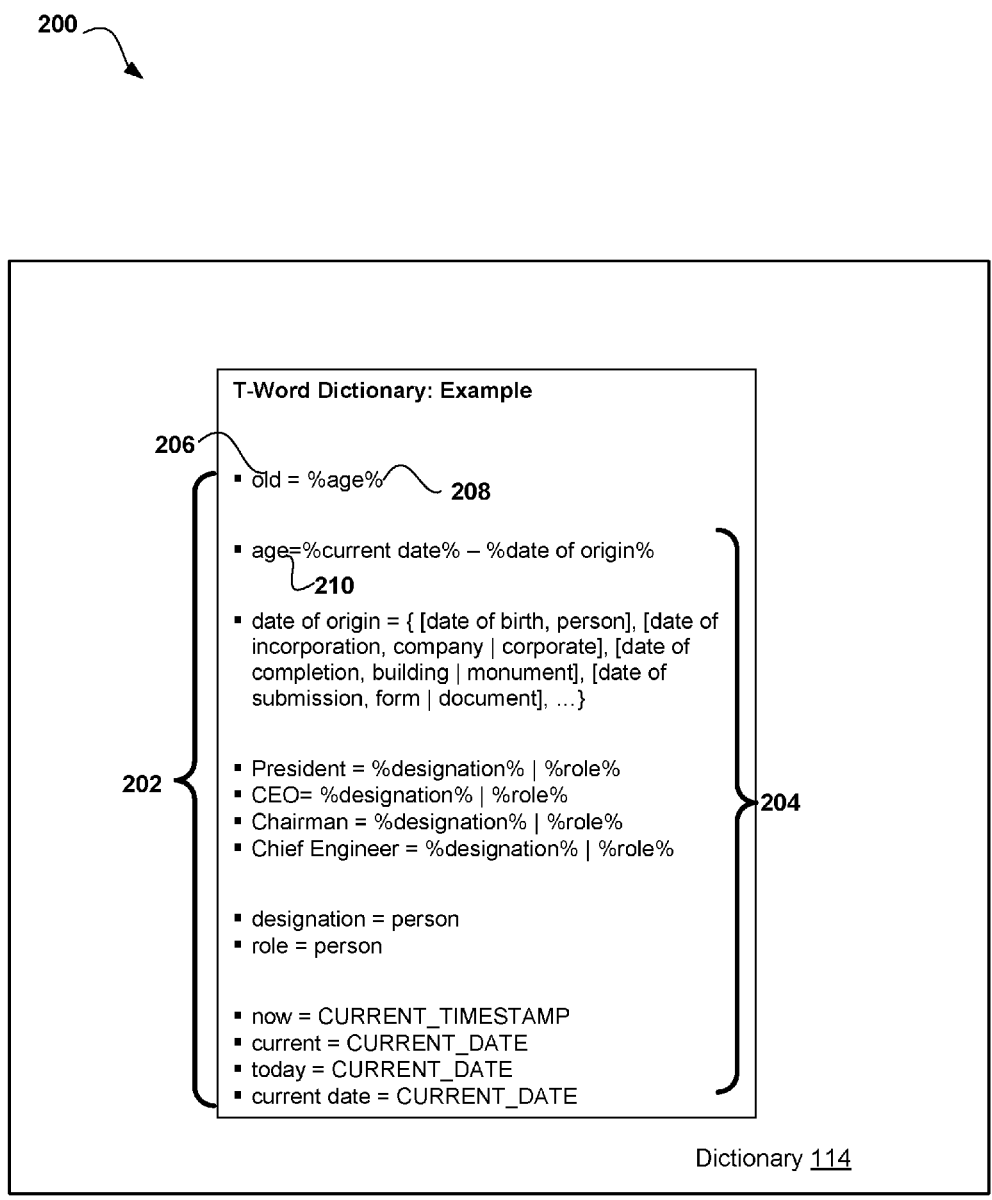
FIG. 2 illustrates an exemplary T-Word Dictionary containing a set of T-Words and their possible corresponding values according to one embodiment.

Referring now to FIG. 2, an exemplary T-Word Dictionary 200 containing a set of T-Words and their possible corresponding values in accordance with one embodiment is depicted. According to at least one implementation, the present embodiment may include a T-Word Dictionary 114 containing contain a set of T-Words 202 and their possible corresponding values 204.

According to the present embodiment, "T-Words" 202 may be defined as time-sensitive words or phrases whose values 204 depend on and may vary with time. As such, T-Words 202 may be generic, domain independent, or domain-specific. Furthermore, the value 204 corresponding to a T-Word 202 may be another T-Word 202, or could be a formula or equation composed of other T-Words 202 or concepts (for example, age=current date−date of origin). Additionally, a T-Word value 204 could be definitive (synonym, concept, attribute, category or fact about an entity or event) [for example, designation=person] or variable (represented through a notation such as % object %). Also, variables may be resolved to another T-Word 202 entry contained within the T-Word Dictionary 114 (for example, for the T-Word 202 "old" 206, the value 204 is a variable 208 (% age %) which can be resolved to another T-Word 202 "age" 210 within the T-Word Dictionary 114).

According to at least one implementation, variable resolution (the process of resolving a variable) may be recursive until all variables are resolved, and this resolution may be context-dependent (for example, the T-Word 202 "old" 206 is resolved to the T-Word 202 "age" 210 which in turn resolves to the formula age=% current date %−% date of origin %. The variable % current date % resolves to the constant CURRENT_DATE which can be retrieved from the system clock. The variable % date of origin % can be resolved to "date of birth" in case of a person, and to "date of completion" in case of a building or monument, based on context. Thus, for a person, the T-word 202 "age" 210 can be resolved to the formula "age"=CURRENT_DATE−"date of birth". Similarly, a designation such as "CEO" can be resolved to a "person". Furthermore, the T-Word Dictionary 114 may be generic, domain independent, or domain specific. Also, the T-Word Dictionary 114 may contain definitive values 204, or variables, or formulas or equations containing variables as previously described. According to the present embodiment, the construct of a T-Word dictionary 114 may be flexible. Additionally, the T-Word Dictionary 114 may be defined and implemented through any acceptable and technically feasible mechanism, such as text list, key-value pair, XML, table in a data repository, etc.

Figure 3A:
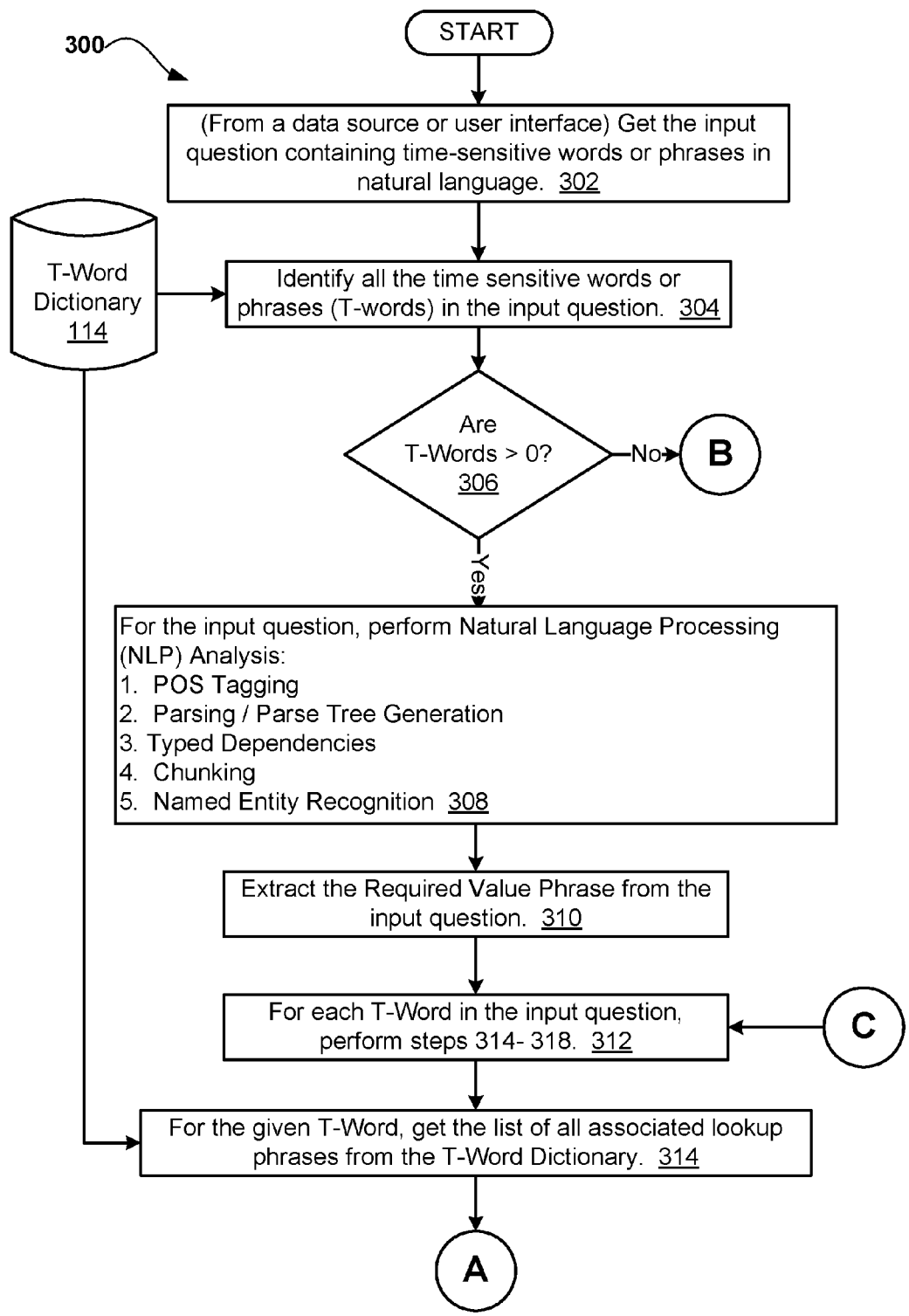
FIGS. 3A-3C are an operational flowchart illustrating an algorithm for answering time-sensitive questions.
Figure 3B:
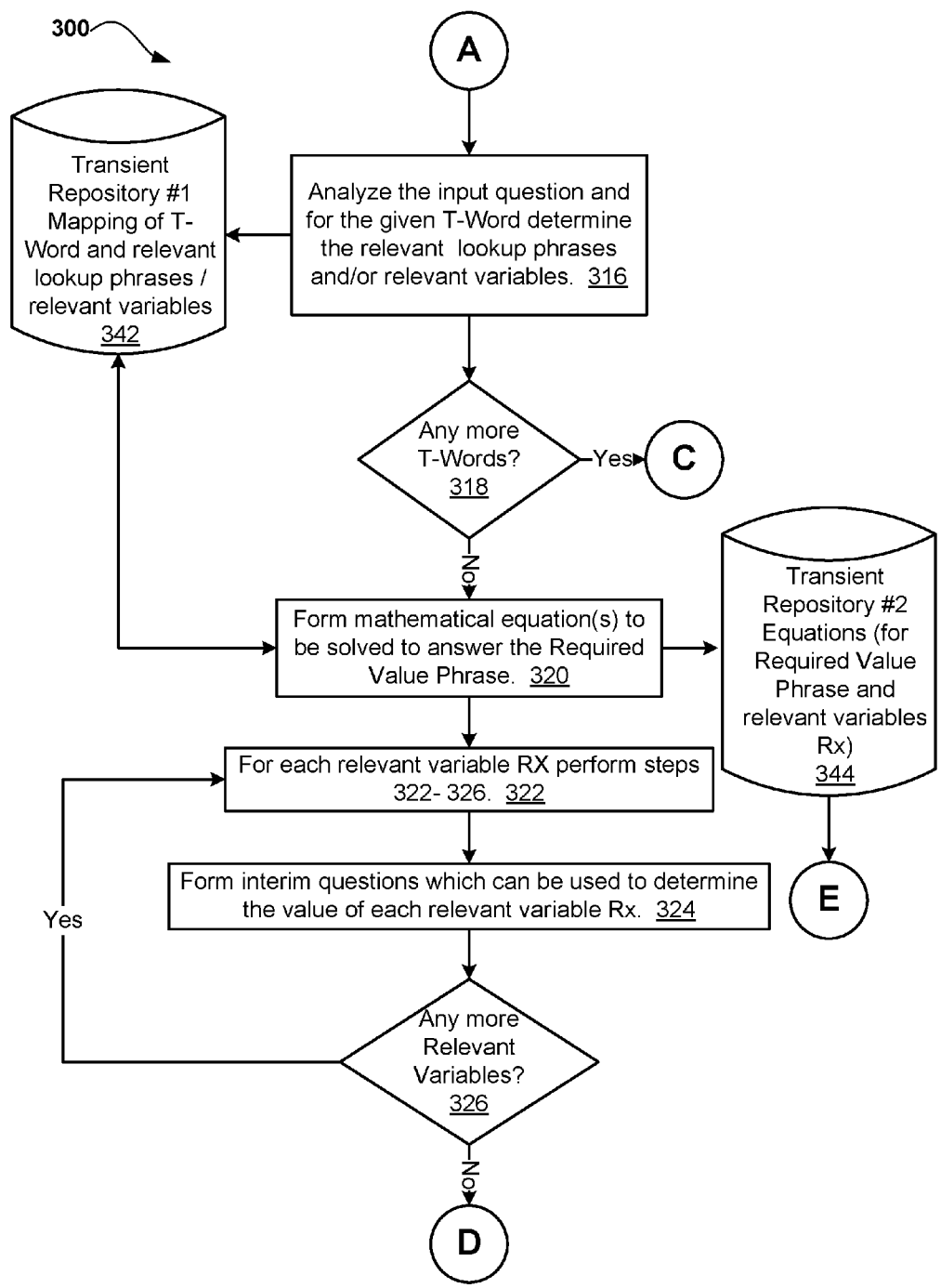
Figure 3C:
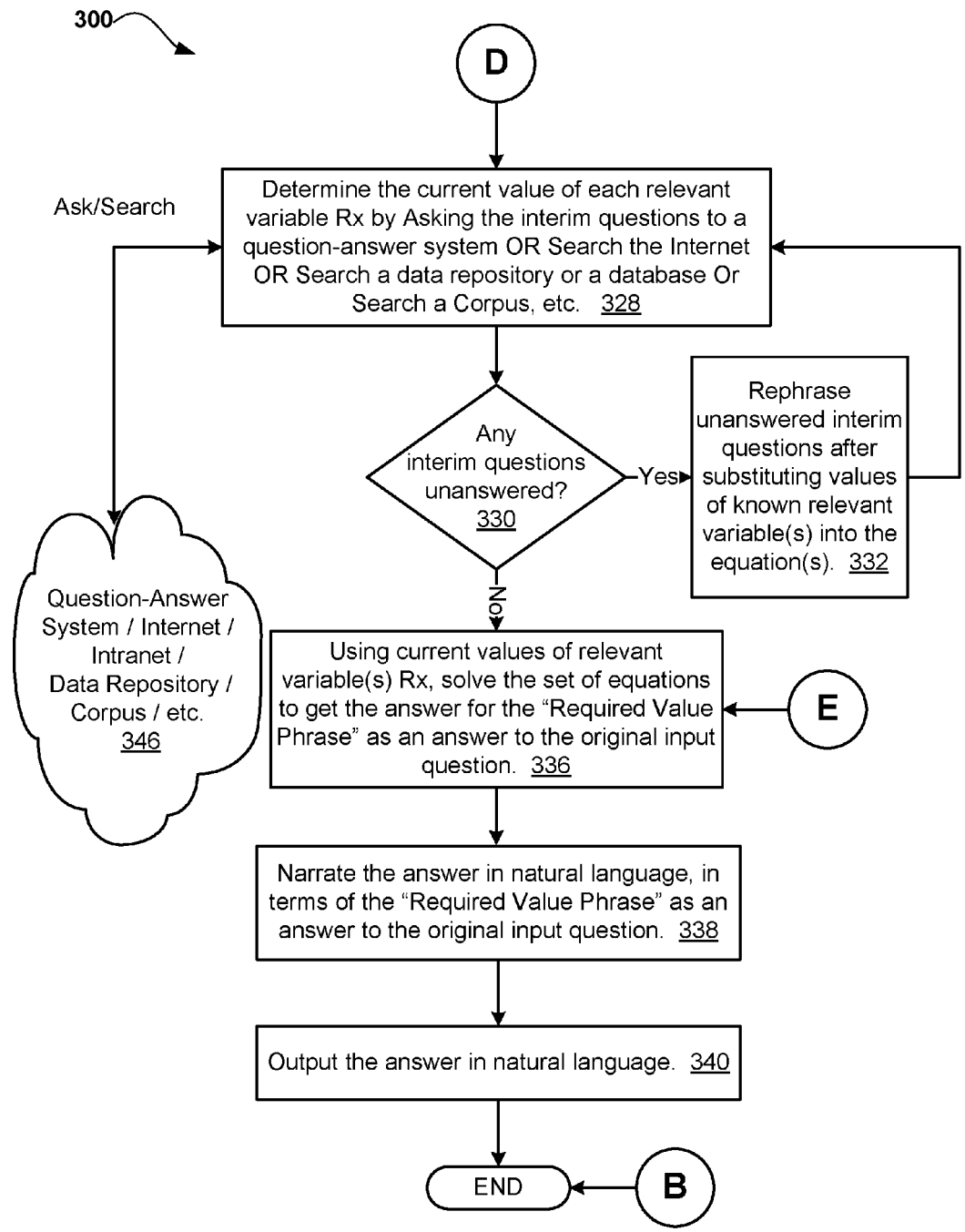
Figure 4A:
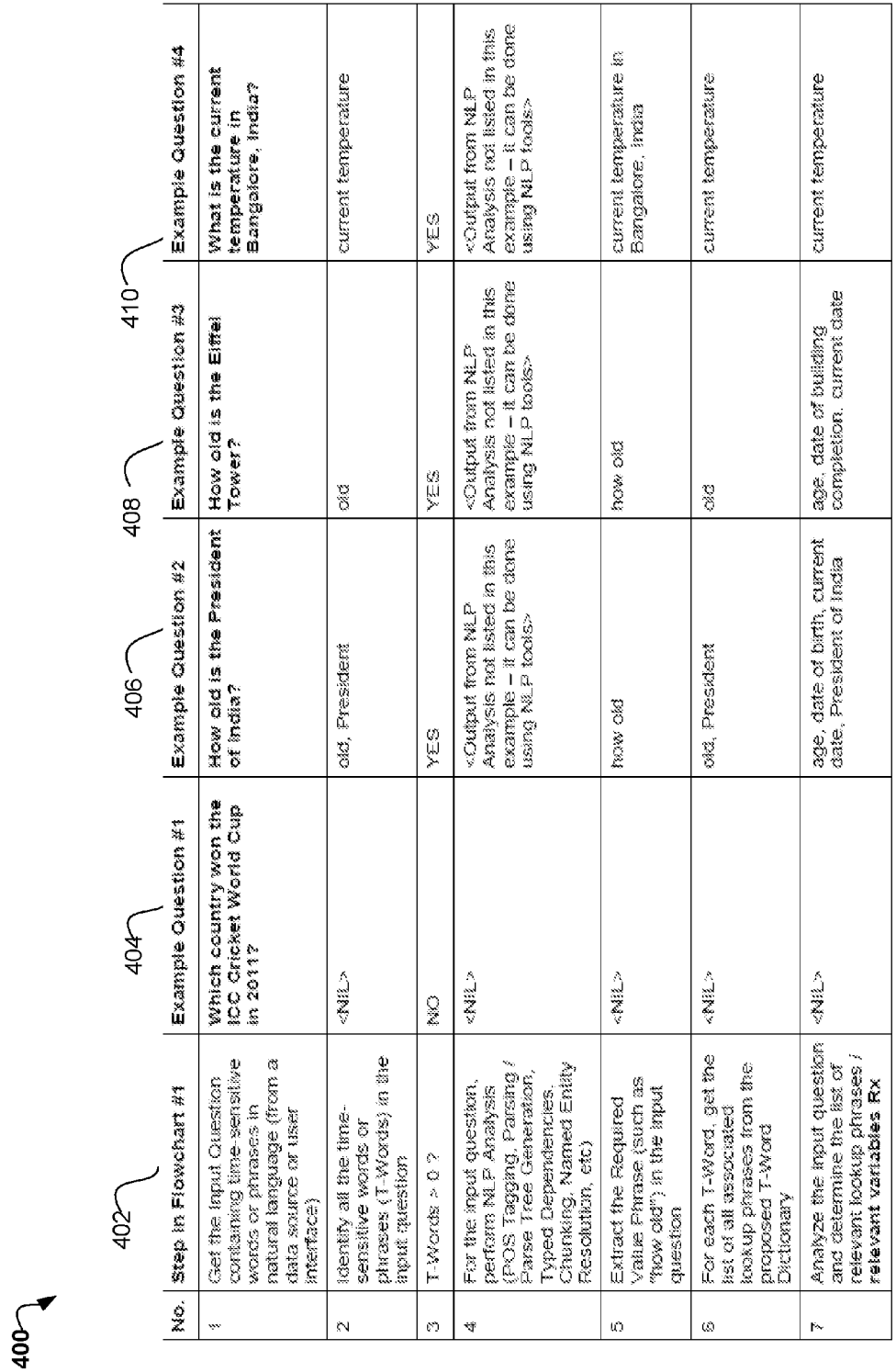

Referring now to FIGS. 3A-3C, an operational flowchart 300 illustrating an algorithm for answering time-sensitive questions. At 302, the method may get the input question containing time-sensitive words or phrases in natural language from a data source or user interface. For example, an input statement may be a statement such as, ("Which country won the ICC Cricket World Cup in 2011?").

Then at 304, all the time-sensitive words or phrases (i.e., T-Words) in the input statement may be identified. According to one implementation, time-sensitive words or phrases (i.e., T-Words) in the input statement may be identified using a T-Word Dictionary 114 (FIG. 1). Next at 306, it is determined whether the input question is time-sensitive and contains any T-Words (i.e., T-Words>0). If at 306, it is determined that the input question is not time-sensitive and does not contain any T-Words (i.e., T-Words=0), then the method may end. However, if at 306, it is determined that the input question is time-sensitive and does contain T-Words (i.e., T-Words>0), then at 308, the method may perform Natural Language Processing (i.e., NLP) analysis (previously described), such as POS tagging; parsing or parse tree generation; typed dependencies; chunking; or named entity recognition. According to at least one implementation, the output of the NLP analysis may be stored in a temporary repository or may be held in memory.

Next at 310, the Required Value phrase is extracted from the input question. According to the present embodiment, the "Required Value Phrase" may be defined as the phrase or term in the input question that needs to be answered in order to answer the time-sensitive question. For example, the method may extract a Required Value Phrase, such as ("how old") from the input question.

Then, at 312, the method may iteratively perform steps 314-318 (described in detail below) for each T-Word in the input question. As such, at 314, the method may get the list of all associated lookup phrases from the T-Word Dictionary for the given T-Word.

Next at 316, the method may analyze the input question for the given T-Word and determine the relevant lookup phrases and/or relevant variables from the Transient Repository #1 342. Then at 318, it is determined whether there are any more T-Words? If at 318, it is determined that there are more T-Words, then the method may continue back to step 312 previously described. However, if at 318, it is determined that there are not any more T-Words, then at 320, the method may form mathematical equation(s) to be solved to answer the Required Value Phrase by referencing the Transient Repository #2 344. As cross-referenced, the present embodiment may utilize the algorithms described with respect to the application entitled, "SOLVING AND ANSWERING ARITHMETIC AND ALGEBRAIC PROBLEMS USING NATURAL LANGUAGE PROCESSING" incorporated by reference herein to form and solve mathematical equations.

Then at 322, the method may iteratively perform steps 322-326 for each relevant variable Rx. As such, at 324, the method may form interim questions which can be used to determine the value of each relevant variable Rx.

Next, at 326, it is determined whether there are any more relevant variables. If at 326, it is determined that there are more relevant variables then the method may continue back to step 322 previously described. However, if at 326, it is determined that there are not any more relevant variables then at 328, the method may determine the current value of each relevant variable Rx by asking the interim questions formed in step 324 to a question-answer system by searching the internet 346; by searching a data repository 346 or database 346; or by searching a Corpus 346, etc.

Then at 330, it is determined whether any questions are unanswered. If at 330 it is determined that there are not any questions unanswered, then the method may continue to step 336 described in detail below. However, if at 330 is determined that there are questions remaining unanswered, then at 332 the method may rephrase unanswered interim questions after substituting values of known relevant variable(s) into the equations(s).

Next, the method may continue back to 328 previously described to determine the current value of each relevant variable Rx by asking the interim questions to a question-answer system by searching the internet 346; by searching a data repository 346 or database 346; or by searching a Corpus 346, etc.

Then at 336, the method may use current values of relevant variable(s) Rx to solve the set of equations to get the answer for the "Required Value Phrase" as an answer to the original input question.

Next at 338, the answer is narrated in natural language, in terms of the "Required Value Phrase" as an answer to the original question. Then at 340, the method outputs the answer in natural language.

It may be appreciated that FIGS. 3A-3C provides only an illustration of one implementation and does not imply any limitations with regard to how different embodiments may be implemented. Many modifications to the depicted environments may be made based on design and implementation requirements.

FIGS. 4A-4F illustrate examples 400 solving time-sensitive questions using the described algorithm 300 in FIGS. 3A-3C in accordance with one embodiment is depicted. As such, the appropriate step 402 of the algorithm 300 is depicted alongside example questions 404-418. For example, with respect to FIG. 4A, the step in the flowchart 402 may be, "Get the input Question containing time-sensitive words or phrases in natural language (from a data source or user interface). The example question 406 may be, "How old is the president of India?" Another step in the flowchart 402 may be to "Identify all the time-sensitive words or phrases (T-Words) in the input question." As such, with respect to the current example, the word "old" and the word "president" may be extracted.

The previously described algorithm 300 (FIG. 3) for answering time-sensitive questions may derive the answers to the example questions #1-8 depicted in FIGS. 4A-4F as follows:

Step 302 in algorithm 300 (FIGS. 3A-3C): Get the Input Question containing time-sensitive words or phrases in natural language (from a data source or user interface)

For example question #1 (404)—Which country won the ICC Cricket World Cup in 2011?
For example question #2 (406)—How old is the President of India?
For example question #3 (408)—How old is the Eiffel Tower?
For example question #4 (410)—What is the current temperature in Bangalore, India?
For example question #5 (412)—How long has the CEO of IBM held office?
For example question #6 (414)—How long has the Chairman of IBM held office?
For example question #7 (416)—What is the petrol price in Bangalore?
For example question #8 (418)—What is the change in petrol price in Bangalore in the past month?

Step 304 in algorithm 300 (FIGS. 3A-3C): Identify all the time-sensitive words or phrases (T-Words) in the input question
For example question #1 (404)—<NIL>
For example question #2 (406)—old, President
For example question #3 (408)—old
For example question #4 (410)—current temperature
For example question #5 (412)—long, CEO
For example question #6 (414)—long, Chairman
For example question #7 (416)—price
For example question #8 (418)—price, past month Step 306 in algorithm 300 (FIGS. 3A-3C): T-Words>0?
For example question #1 (404)—NO
It may be noted that Question #1 (404) does not contain any time-sensitive words, and thus T-Words=0. In Step 306, the condition "T-Words>0?" evaluates to false, and the algorithm will end for this question, since there are no T-Words to be processed.
For example question #2 (406)—YES
For example question #3 (408)—YES
For example question #4 (410)—YES
For example question #5 (412)—YES
For example question #6 (414)—YES
For example question #7 (416)—YES
For example question #8 (418)—YES For all the other questions #2 thru #8 (406 thru 418), the condition "T-Words>0?" in step 306 evaluates to TRUE, and the algorithm continues.

Step 308 in algorithm 300 (FIGS. 3A-3C): For the input question, perform NLP Analysis (POS Tagging, Parsing/Parse Tree Generation, Typed Dependencies, Chunking, Named Entity Resolution, etc.)
For questions #2 thru #8 (406 thru 418), the NLP analysis steps mentioned in the algorithm step 308 can be done using available NLP tools. The detailed NLP output is not listed here in this example, but can easily be understood by someone familiar with general NLP concepts.

Step 310 in algorithm 300 (FIGS. 3A-3C): Extract the Required Value Phrase (such as "how old") in the input question
For example question #2 (406)—how old
For example question #3 (408)—how old
For example question #4 (410)—current temperature in Bangalore, India
For example question #5 (412)—how long
For example question #6 (414)—how long
For example question #7 (416)—petrol price in Bangalore
For example question #8 (418)—change in petrol price in Bangalore Steps 312-314 in algorithm 300 (FIGS. 3A-3C): For each T-Word, get the list of all associated lookup phrases from the proposed T-Word Dictionary
For example question #2 (406)—old, President
For example question #3 (408)—old
For example question #4 (410)—current temperature
For example question #5 (412)—long, CEO
For example question #6 (414)—long, Chairman
For example question #7 (416)—price
For example question #8 (418)—price, past month Step 316 in algorithm 300 (FIGS. 3A-3C): Analyze the input question and determine the list of relevant lookup phrases/relevant variables Rx
For example question #2 (406)—age, date of birth, current date, President of India
For example question #3 (408)—age, date of building completion, current date
For example question #4 (410)—current temperature
For example question #5 (412)—date of assuming office, current date, CEO of IBM
For example question #6 (414)—date of assuming office, current date, Chairman of IBM
For example question #7 (416)—price per liter
For example question #8 (418)—price, current date, previous date Step 320 in algorithm 300 (FIGS. 3A-3C): Form mathematical equation(s) to be solved to answer the Required Value Phrase
For example question #2 (406)—age=current date−date of birth
For example question #3 (408)—age=current date−date of building completion
For example question #4 (410)—current temperature @now
For example question #5 (412)—how long=current date−date of assuming office
For example question #6 (414)—how long=current date−date of assuming office
For example question #7 (416)—current price per liter @now
For example question #8 (418)—previous date=current date−1 month; change in petrol price=petrol price (current date)−petrol price (previous date)

Step 324 in algorithm 300 (FIGS. 3A-3C): For each relevant variable Rx, form interim questions for determining value of each relevant variable equation(s) to be solved to answer the Required Value Phrase
For example question #2 (406)—What is the current date? Who is the President of India? What is the date of birth of the President of India?
For example question #3 (408)—What is the current date? What is the date of building completion of Eiffel Tower?
For example question #4 (410)—What is the current temperature in Bangalore, India?
For example question #5 (412)—What is the current date? Who is the CEO of IBM? What is the date of assuming office of the CEO of IBM?
For example question #6 (414)—What is the current date? Who is the Chairman of IBM? What is the date of assuming office of the Chairman of IBM?
For example question #7 (416)—What is the current price per liter for petrol in Bangalore?
For example question #8 (418)—What is the current date? What was the previous date?

What is the current price per liter for petrol in Bangalore India?

What was the price per liter for petrol in Bangalore India on previous date?

Step 328 in algorithm 300 (FIGS. 3A-3C): Determine the current value of each relevant variable Rx by Asking the interim questions to a question-answer system OR Search the Internet OR Search a data repository or database OR Search a Corpus, etc.

For example question #2 (406)—Current Date=9 Aug. 2013
President of India=Pranab Mukherjee
What is the date of birth of the President of India?

For example question #3 (408)—Current date=9 Aug. 2013 date of building completion=31 Mar. 1889

For example question #4 (410)—25 degree C. at 8.45 pm on 9 Aug. 2013 (source: http://www.acuweather.com For example question #5 (412)—Current Date=9 Aug. 2013 CEO of IBM=Virginia Rometty
What is the date of assuming office of the CEO of IBM?

For example question #6 (414)—Current Date=9 Aug. 2013
Chairman of IBM=Virginia Rometty
What is the date of assuming office of the Chairman of IBM?

For example question #7 (416)—78.12 INR/Liter on 9 Aug. 2013 (source: http://www.mypetrolprice.com)

For example question #8 (418)—Current date=9 Aug. 2013
Previous date=current date−1 month=9 Jul. 2013
Current petrol price per liter in Bangalore=78.12 INR/Liter on 9 Aug. 2013 (source: http://www.mypetrolprice.com)
What was the price per liter for petrol in Bangalore India on previous date?

Step 330 in algorithm 300 (FIGS. 3A-3C): Any interim question unanswered
For example question #2 (406)—YES
For example question #3 (408)—NO
For example question #4 (410)—NO
For example question #5 (412)—YES
For example question #6 (414)—YES
For example question #7 (416)—NO
For example question #8 (418)—YES From the above, it is noted that after Step 330, there are unanswered questions for questions #2 (406), #5 (412), #6 (414) and #8 (418). For these questions, the algorithm will continue to an iterative loop in step 332. For the questions #3 (408), #4 (410) and #7 (416), there are no questions unanswered and the algorithm will proceed to step 336.

Iterative Loop—Step 332 in algorithm 300 (FIGS. 3A-3C): Rephrase unanswered interim questions by substituting values of known relevant variable(s) into the equation(s)

For example question #2 (406)—What is date of birth of Pranab Mukherjee (President of India)?
For example question #5 (412)—What is date of assuming office of Virginia Rometty (CEO of IBM)?
For example question #6 (414)—What is date of assuming office of Virginia Rometty (Chairman of IBM)?
For example question #8 (418)—What was the price per liter for petrol in Bangalore India on 9 Jul. 2013?

Iterative Loop Step 328 in algorithm 300 (FIGS. 3A-3C): Determine the current value of each remaining relevant variable Rx by Asking the rephrased interim questions to a question-answer system OR Search the Internet OR Search a data repository or database OR Search a Corpus, etc For example question #2 (406)—Date of birth of Pranab Mukherjee (President of India)=11 Dec. 1935
For example question #5 (412)—Date of assuming office of Virginia Rometty (CEO of IBM)=1 Jan. 2012
For example question #6 (414)—Date of assuming office of Virginia Rometty (Chairman of IBM)=1 Oct. 2012
For example question #8 (418)—75.41 INR/Liter on 9 Jul. 2013 (source: http://www.mypetrolprice.com)

Iterative Loop Step 330 in algorithm 300 (FIGS. 3A-3C): Any interim question unanswered
For example question #2 (406)—NO
For example question #5 (412)—NO
For example question #6 (414)—NO
For example question #8 (418)—NO From the above, it is noted that after one iteration of the loop (steps 332 and 328), in Step 330 there are no questions unanswered and the algorithm will proceed to step 336.

Step 336 in algorithm 300 (FIGS. 3A-3C): Using current values of relevant variable(s) Rx, solve the set of equations to get the answer for the "Required Value Phrase"

For example question #2 (406)—age=9 Aug. 2013-11 Dec. 1935=77 years 7 months 29 days
For example question #3 (408)—age=9 Aug. 2013-31 Mar. 1889=124 years 4 months 9 days
For example question #4 (410)—25 degree C. at 8.45 pm on 9 Aug. 2013 (source: http://www.acuweather.com)
For example question #5 (412)—duration in office=9 Aug. 2013-1 Jan. 2012=1 year 07 months 09 days
For example question #6 (414)—duration in office=9 Aug. 2013-1 Oct. 2012=10 months 9 days
For example question #7 (416)—78.12 INR/Liter on 9 Aug. 2013 (source: http://www.mypetrolprice.com)
For example question #8 (418)—change in petrol price=petrol price (current date)−petrol price (previous date)=78.12-75.41=+2.71 INR/Liter Step 338 in algorithm 300 (FIGS. 3A-3C): Narrate the answer in natural language, in terms of the "Required Value Phrase" as an answer to the original input question For example question #2 (406)—President of India (Pranab Mukherjee) is 77 years 7 months 29 days old
For example question #3 (408)—Eiffel Tower is 124 years 4 months 9 days old
For example question #4 (410)—Current temperature in Bangalore, India is 25 degree C. at 8.45 pm on 9 Aug. 2013 (source: http://www.acuweather.com)
For example question #5 (412)—CEO of IBM (Virginia Rometty) has held office for 1 year 07 months 09 days till date
For example question #6 (414)—Chairman of IBM (Virginia Rometty) has held office for 10 months 9 days till date
For example question #7 (416)—Petrol price in Bangalore is INR 78.12 per Liter on 09-Aug-2013 (source: http://www.mypetrolprice.com)
For example question #8 (418)—Change in petrol price in Bangalore in the past month is +2.71 INR/Liter.

Figure 5:
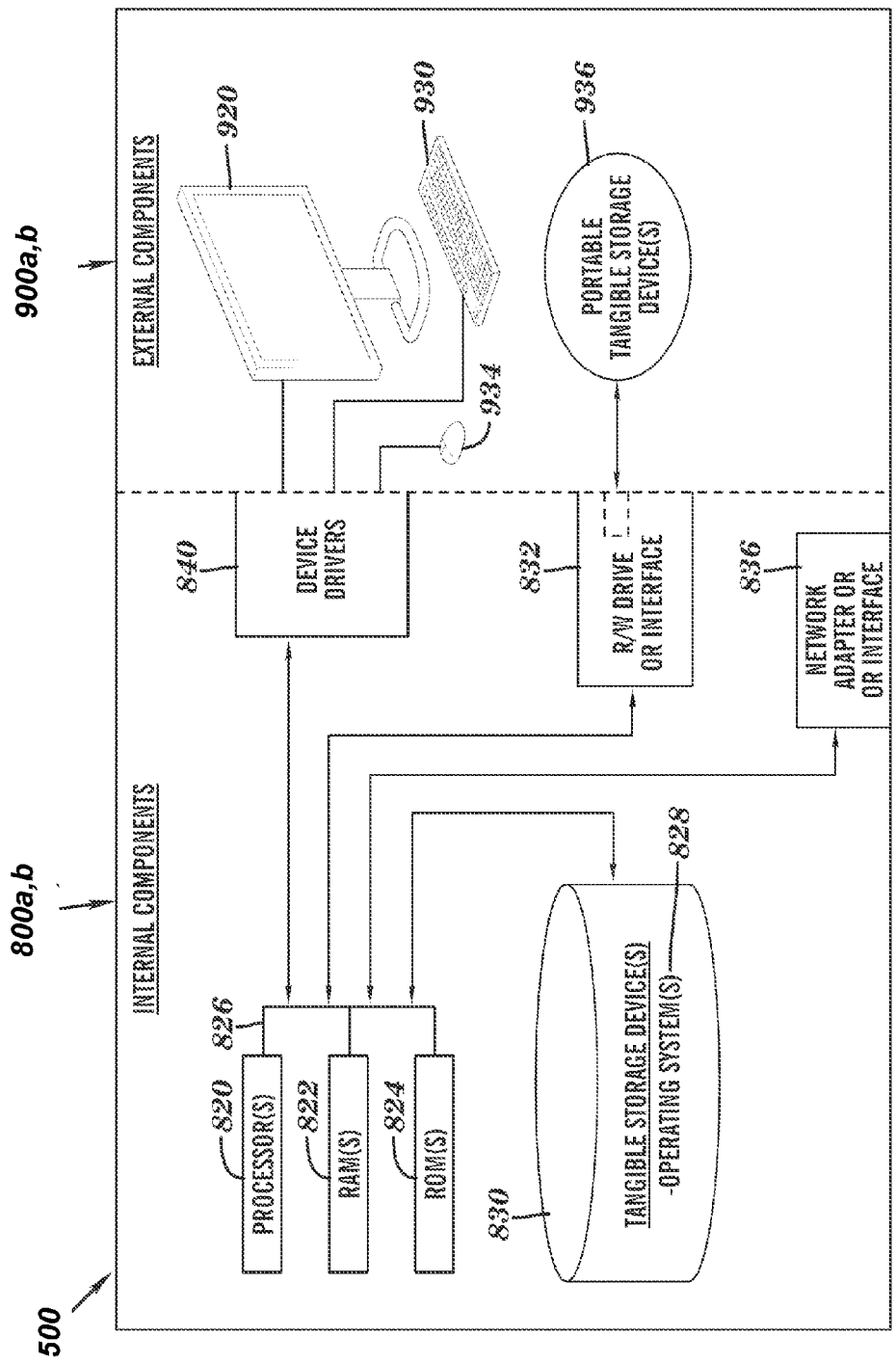
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 5 Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and Answering Time-sensitive Questions Program 108A (FIG. 1) in client computer 102 (FIG. 1) and Answering Time-sensitive Questions Program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as Answering Time-sensitive Questions Program 108A and 108B (FIG. 1), can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The Answering Time-sensitive Questions Program 108A (FIG. 1) in client computer 102 (FIG. 1) and Answering Time-sensitive Questions Program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the Answering Time-sensitive Questions Program 108A (FIG. 1) in client computer 102 (FIG. 1) and the Answering Time-sensitive Questions Program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing an answer to an input question containing at least one time-sensitive word or at least one time-sensitive phrase using natural language processing (NLP), the method comprising:

creating and maintaining an online T-Word Dictionary, wherein creating and maintaining the online T-Word Dictionary comprises:
    determining a relationship between a plurality of T-Words and a plurality of corresponding values, wherein the plurality of corresponding values include a plurality of related lookup phrases and a plurality of concept terms;
    mapping the plurality of T-Words to the plurality of corresponding values based on the determined relationship; and
    storing the mapped plurality of T-Words to the plurality of corresponding values in the online T-Word Dictionary;

receiving the input question, wherein the input question is entered by a user via a graphical user interface associated with a first computer;

performing natural language processing (NLP) analysis on the input question to extract a required value phrase;

forming at least one mathematical equation based on the extracted required value phrase, wherein forming the at least one mathematical equation comprises:
    identifying the at least one time-sensitive word or the at least one time-sensitive phrase contained in the received input question, wherein a value associated with the identified at least one time-sensitive word or the at least one time-sensitive phrase varies according to a particular point in time, and wherein the identifying comprises communicating online with a second computer to access the online T-Word Dictionary; and
    resolving the identified at least one time-sensitive word or the at least one time-sensitive phrase contained in the received input question, wherein the resolving comprises communicating online with the second computer to access the online T-Word Dictionary and recursively mapping a plurality of variables associated with the identified at least one time-sensitive word or the at least one time-sensitive phrase to at least one formula contained in the T-Word Dictionary;

determining the answer to the input question in natural language based on the solved at least one mathematical equation, wherein the determining comprises the first computer interacting with an on-line question-answer system to search an internet, a plurality of online data repositories, a plurality of online databases, and a plurality of online corpuses according to the value associated with the identified at least one time-sensitive word or the at least one time-sensitive phrase at the particular point in time; and narrating the answer to the input question in natural language based on the solved at least one mathematical equation.

2. The method of claim 1 further comprising:
determining at least one relevant variable based on the extracted required value phrase; and
determining at least one current value for the at least one determined relevant variable.

3. The method of claim 1, wherein identifying the at least one time-sensitive word or the at least one time-sensitive phrase comprises the use of a T-Word Dictionary.

4. The method of claim 1, wherein an output from the natural language processing (NLP) is stored in a temporary repository or held in memory.

5. The method of claim 3, wherein the T-Word Dictionary comprises a set of T-Words and their corresponding values.

6. The method of claim 2, wherein determining the at least one current value comprises asking at least one interim question to at least one of a question-answer system by searching an internet; by searching a data repository or database; and by searching a Corpus.

7. The method of claim 3, wherein the T-word Dictionary comprises the use of a text list; a key-value pair; an XML; or a table in a data repository.

8. The method of claim 1, wherein performing natural language processing (NLP) analysis on the input question comprises at least one of performing part-of-speech (POS) tagging; performing parsing or syntactic analysis; performing phrase chunking; performing named entity recognition (NER); and determining a typed dependency.

9. A computer system for providing an answer to an input question containing at least one time-sensitive word or at least one time-sensitive phrase using natural language processing (NLP), the computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
creating and maintaining an online T-Word Dictionary, wherein creating and maintaining the online T-Word Dictionary comprises:
determining a relationship between a plurality of T-Words and a plurality of corresponding values, wherein the plurality of corresponding values include a plurality of related lookup phrases and a plurality of concept terms;
mapping the plurality of T-Words to the plurality of corresponding values based on the determined relationship; and
storing the mapped plurality of T-Words to the plurality of corresponding values in the online T-Word Dictionary;

receiving the input question, wherein the input question is entered by a user via a graphical user interface associated with a first computer;
performing natural language processing (NLP) analysis on the input question to extract a required value phrase;
forming at least one mathematical equation based on the extracted required value phrase, wherein forming the at least one mathematical equation comprises:
identifying the at least one time-sensitive word or the at least one time-sensitive phrase contained in the received input question, wherein a value associated with the identified at least one time-sensitive word or the at least one time-sensitive phrase varies according to a particular point in time, and wherein the identifying comprises communicating online with a second computer to access the online T-Word Dictionary; and
resolving the identified at least one time-sensitive word or the at least one time-sensitive phrase contained in the received input question, wherein the resolving comprises communicating online with the second computer to access the online T-Word Dictionary and recursively mapping a plurality of variables associated with the identified at least one time-sensitive word or the at least one time-sensitive phrase to at least one formula contained in the T-Word Dictionary;
determining the answer to the input question in natural language based on the solved at least one mathematical equation, wherein the determining comprises the first computer interacting with an on-line question-answer system to search an internet, a plurality of online data repositories, a plurality of online databases, and a plurality of online corpuses according to the value associated with the identified at least one time-sensitive word or the at least one time-sensitive phrase at the particular point in time; and
narrating the answer to the input question in natural language based on the solved at least one mathematical equation.

10. The computer system of claim 9, further comprising:
determining at least one relevant variable based on the extracted required value phrase; and
determining at least one current value for the at least one determined relevant variable.

11. The computer system of claim 9, wherein identifying the at least one time-sensitive word or the at least one time-sensitive phrase comprises the use of a T-Word Dictionary.

12. The computer system of claim 9, wherein an output from the natural language processing (NLP) is stored in a temporary repository or held in memory.

13. The computer system of claim 11, wherein the T-Word Dictionary comprises a set of T-Words and their corresponding values.

14. The computer system of claim 10, wherein determining the at least one current value comprises asking at least one interim question to at least one of a question-answer system by searching an internet; by searching a data repository or database; and by searching a Corpus.

15. The computer system of claim 12, wherein the T-word Dictionary comprises the use of a text list; a key-value pair; an XML; or a table in a data repository.

16. The computer system of claim 9, wherein performing natural language processing (NLP) analysis on the input question comprises at least one of performing part-of-speech (POS) tagging; performing parsing or syntactic analysis; performing phrase chunking; performing named entity recognition (NER); and determining a typed dependency.

17. A computer program product providing an answer to a question containing at least one time-sensitive word or at least one time-sensitive phrase using natural language processing (NLP), the computer program product comprising:

one or more computer-readable storage devices and program instructions stored on at least one of the one or more tangible storage devices, the program instructions executable by a processor, the program instructions comprising:

program instructions to create and maintaining an online T-Word Dictionary, wherein creating and maintaining the online T-Word Dictionary comprises:

program instructions to determine a relationship between a plurality of T-Words and a plurality of corresponding values, wherein the plurality of corresponding values include a plurality of related lookup phrases and a plurality of concept terms;

program instructions to mapping the plurality of T-Words to the plurality of corresponding values based on the determine relationship; and program instructions to store the mapped plurality of T-Words to the plurality of corresponding values in the online T-Word Dictionary;

program instructions to receive the input question, wherein the input question is entered by a user via a graphical user interface associated with a first computer;

program instructions to perform natural language processing (NLP) analysis on the input question to extract a required value phrase;

program instructions to form at least one mathematical equation based on the extracted required value phrase, wherein forming the at least one mathematical equation comprises:

program instructions to identify the at least one time-sensitive word or the at least one time-sensitive phrase contained in the received input question, wherein a value associated with the identified at least one time-sensitive word or the at least one time-sensitive phrase varies according to a particular point in time, and wherein the identifying comprises communicating online with a second computer to access the online T-Word Dictionary; and program instructions to resolve the identified at least one time-sensitive word or the at least one time-sensitive phrase contained in the received input question, wherein the resolving comprises communicating online with the second computer to access the online T-Word Dictionary and recursively mapping a plurality of variables associated with the identified at least one time-sensitive word or the at least one time-sensitive phrase to at least one formula contained in the T-Word Dictionary;

program instructions to determine the answer to the input question in natural language based on the solved at least one mathematical equation, wherein the determining comprises the first computer interacting with an on-line question-answer system to search an internet, a plurality of online data repositories, a plurality of online databases, and a plurality of online corpuses according to the value associated with the identified at least one time-sensitive word or the at least one time-sensitive phrase at the particular point in time; and program instructions to narrate the answer to the input question in natural language based on the solved at least one mathematical equation.

18. The computer program product of claim 17 further comprising:

determining at least one relevant variable based on the extracted required value phrase; and determining at least one current value for the at least one determined relevant variable.

19. The computer program product of claim 17, wherein identifying the at least one time-sensitive word or the at least one time-sensitive phrase comprises the use of a T-Word Dictionary.

20. The computer program product of claim 17, wherein an output from the natural language processing (NLP) is stored in a temporary repository or held in memory.

* * * * *